United States Patent Office 3,505,347
Patented Apr. 7, 1970

3,505,347
SUBSTITUTED BENZENESULPHONAMIDO-THIAZOLINES
Jacques Baetz, La Garenne-Colombes, France, assignor to Seperic, Morat, Switzerland, a Swiss body corporate
No Drawing. Filed Nov. 14, 1966, Ser. No. 593,724
Claims priority, application Great Britain, Nov. 19, 1965, 49,171/65
Int. Cl. C07d 91/14, 91/26
U.S. Cl. 260—306.7      6 Claims

ABSTRACT OF THE DISCLOSURE

Benzenesulphonyl-2-amino-Δ-2-thiazolines mono- di- or tri-substituted on the benzene ring by chlorine or fluorine atoms or lower alkyl groups. These compounds have antibacterial activity.

---

The present invention concerns a family of novel chemical compounds having useful therapeutic properties and, in particular, a substantial antibacterial activity useful in humans for the treatment of infectious conditions.

Said compounds are sulphonamides of general formula:

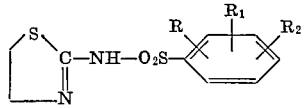

(I)

or

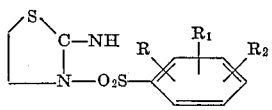

(II)

wherein substitutents R, $R_1$ and $R_2$, which may occupy any one of the free positions of the benzene nucleus and which may be the same or different, are each hydrogen, a chlorine or fluorine atom or an alkyl group having 1–4 carbon atoms, and their addition salts with pharmaceutically acceptable acids.

Preferably, all three substituents R, $R_1$ and $R_2$ are not simultaneously hydrogen and, when one of them is a methyl group, one at least of the other two is not hydrogen.

It is known that aminothiazoline structures of the type illustrated by Formula I are conventionally equivalent to the iminothiazolidine structures of the type illustrated by Formula II. This explains the dual character of formulae within the definition of the present compounds. For purposes of simplicity, such compounds will be considered hereinafter as corresponding to structure (I) and thus as benzenesulphonyl-2-amino-Δ-2-thiazolines which are, if desired, susbtituted on the benzene nucleus. This, however, should not be considered as limitative as to the actual structure of the compounds, the existence in their infrared spectra of a vibration for an extra-cyclic C=NH grouping seeming, furthermore, to be in favour of structure (II).

To prepare such compounds, the benzenesulfochloride suitably substituted on the benzene nucleus, of general formula:

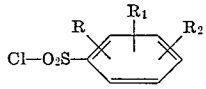

is reacted with the 2-amino-Δ-2-thiazoline and the resulting sulphonamide is, if desired, salified.

The reaction is advantageously effected by contacting an alkaline aqueous 2-amino-Δ-2-thiazoline solution with an organic benzene sulphochloride solution. The reaction occurs readily without heating and, on the contrary, it is sometimes advisable to refrigerate with an ice bath, for example.

A typical procedure is as follows:

In a vessel are introduced, with stirring, 2-amino-Δ-2 thiazoline base dissolved in an alkaline aqueous solution such as a 6% w./v. sodium hydroxide solution or an alkali metal carbonate solution.

An equimolar (or slightly higher) amount of benzene sulphochloride suitably substituted on the benzene nucleus dissolved in an organic solvent (benzene, toluene, carbon tetrachloride, etc.) is added with stirring.

In a modified procedure the 2-amino-Δ-2-thiazoline is used as a solution in water and the alkaline product is added after addition of the benzene sulphochloride solution.

When this step is complete, one insures that the solution is still alkaline, and the resultant product is precipitated in the cold by maintaining the solution in the refrigerator, for example. There results a precipitate that is suction filtered, washed with water and then dried in air and which may be recrystallized from alcohol or a suitable solvent.

The sulphonamides thus obtained may be converted, conventionally, into pharmaceutically acceptable inorganic or organic acid salts. Thus, for example, hydrochlorides may be produced therefrom, in water/alcohol media, and there are obtained crystalline products, often containing one mole ethanol, exhibiting improved water-solubility.

The following examples are given for the purpose of illustrating such preparation.

EXAMPLE 1

4' - chloro-3'-methyl-benzenesulphonyl-2-amino-Δ-2-thiazoline or 3'-methyl-4'-chloro-benzenesulphonyl-3-2-imino thiazolidine (both structures being equivalent)

The empirical formula of this compound is $$C_{10}H_{11}O_2N_2S_2Cl$$

and its molecular weight is 290.803. The preparation thereof is effected as follows:

In a conical 500 ml. flask provided with a magnetic stirrer, are introduced 61 g. 2-amino-thiazoline base dissolved in sodium hydroxide (24 g. in 150 ml. water); to this are added dropwise, with stirring, 135 g. 4-chloro-3-methyl benzene sulphochloride dissolved in 60 ml. toluene. The solution is stirred for a further 30 minutes in an ice bath. It is left one hour in the refrigerator. It is then suction filtered and dried in vacuo. Recrystallization is effected from hot alcohol. There is obtained a product which, on cooling, produces a precipitate which is dried in vacuo.

Melting point (capillary tube)—118–120° C.
Nitrogen percent—theory: 9.66; found: 9.20.
Carbon percent—theory: 41.13; found: 40.71.

The hydrochloride of this sulphonamide is prepared by dissolving 10 g. 4'-chloro-3'-methyl-benzenesulphonyl-2-amino-Δ-2-thiazoline in 100 ml. ethanol, in the hot. The resultant solution is filtered; it is then cooled to incipient crystallization, and gaseous hydrochloric acid is then bubbled through to saturation. The hydrochloride crystallizes on cooling. This is suction filtered, and washed with 2×10 ml. cold ethanol.

The material is dried in vacuo in the presence of potassium hydroxide.

There are obtained 9.5 g. of 4'-chloro-3'-methyl-benzenesulphonyl-2-amino-Δ-2-thiazoline hydrochloride.

Yield: 74%.

Melting point (capillary tube): 191–193° C. The product crystallizes with one mole ethanol.

Nitrogen percent—theory: 7.03; calculated: 7.50.
Carbon percent—theory: 38.08; calculated: 38.61.

EXAMPLE 2

4'-chloro-benzenesulphonyl-2-amino-Δ-2-thiazoline or 4'-chloro-benzenesulphonyl-3,2-imino-thiazolidine In 125 ml. water there are dissolved 20.4 g. (0.2 mole) 2-amino-Δ-2-thiazoline. The solution is refrigerated, with stirring, in an ice bath, and a solution of 42.4 g. 4-chloro-benzenesulphochloride dissolved in 50 ml. benzene is then added.

When the temperature reaches 10° C., 20 ml. soda lye diluted to 100 ml. are added over 20 minutes, the temperature being maintained below 10° C. The sulphonamide precipitates out. Stirring is continued for a further 15 minutes.

The material is suction filtered on a Buchner funnel. It is washed with 3×50 ml. water, and once with 50 ml. petroleum ether.

There are obtained 31.5 g. 4-chloro-benzenesulphonyl-2-amino-Δ-2-thiazoline.

Yield: 57%.

Melting point (capillary tube): 98–99° C.

Nitrogen percent—theory: 10.11; found: 10.09.

Carbon percent—theory: 39.30; found: 38.24.

The crude product is recrystallized from absolute ethyl alcohol, with heating followed by cooling.

Crystallization yield: 70%.

To prepare the sulphonamide hydrochloride, 20 g. 4'-chloro-benzenesulphonyl-2-amino-Δ-2-thiazoline are dissolved in 20 ml. absolute ethanol in the hot. The reaction mixture is filtered; it is then cooled and gaseous hydrochloric acid is bubbled through to saturation. On cooling, the hydrochloride crystallizes out as fluffy crystals.

The material is dried in vacuo in the presence of potassium hydroxide. There are obtained 15 g. 4'-chloro-benzenesulphonyl-2-amino-Δ-2-thiazoline hydrochloride.

Yield: 66%.

Melting point: 104° C.

The hydrochloride crystallizes with one molecule of alcohol.

Nitrogen percent—theory: 7.55; found: 7.80.

Carbon percent—theory: 36.30; found: 36.77.

The physical-chemical properties of the compounds according to Examples 1 and 2 and of other compounds according to the invention prepared in a similar manner are summarized in the table below:

With the novel sulphonamides, incomplete inhibition is noted at 1.40 mg./ml. culture medium and complete inhibition with 2 mg./ml. culture medium whereas, under the same conditions, sulphamethyl-thiadiazole inhibits the growth of colibacillus incompletely at 2 mg./ml. and completely at 2.80 mg./ml.

On the other hand, in vivo, the death rate in mice, due to different germs, and particularly to colibacillus, is more reduced by these novel sulphonamides than by sulphamethylthiadiazole at the same dosage.

In addition, 4'-chloro-benzenesulphonyl-2-amino-Δ-2-thiazoline was found to have diuretic properties that are particularly useful in the treatment of colibacillosis the pathological effect of which is chiefly apparent in the urinary system.

These results were confirmed by experimentation in human clinics; thus, the novel sulphonamides are therapeutically useful in infectious conditions.

For such use, the sulphonamides may be administered orally or parenterally in the form of therapeutic compositions containing the usual vehicles and excipients suitable for such routes of administration.

Thus, for oral administration, the sulphonamides may be formulated in unit dosage form containing from 100 to 500 mg. of sulphonamide. For parenteral administration, a suitable form is a sulphonamide solution in an injectable organic solvent, the therapeutic composition being, for example, in the form of 2 ml. ampoules containing 500 mg. of sulphonamide.

The novel sulphonamides may be administered generally to adults at a daily dosage regimen of 500 mg. to 2 g.

Having now described my invention, what I claim as new and desire to secure by Letters Patent is:

1. Sulphonamides of general formula selected from

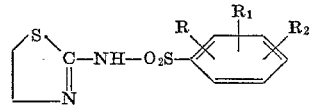

(I)

and

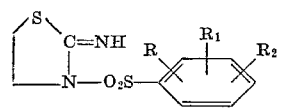

(II)

| | Molecular weight | Melting point, °C. (capillary tube) | Nitrogen percent | | Carbon percent | |
|---|---|---|---|---|---|---|
| | | | Calculated | Found | Calculated | Found |
| 4'-chloro-benzenesulphonyl-2-amino-thiazoline | 276.776 | 98–99 | 10.11 | 10.09 | 39.06 | 38.24 |
| 3'-chloro-4'-methyl-benzenesulphonyl-2-amino-Δ-2-thiazoline | 290.803 | 87–88 | 9.63 | 9.86 | 41.30 | 41.37 |
| 3',5'-dichloro-4'-methyl-benzenesulphonyl-2-amino-Δ-2-thiazoline | 325.252 | 154–156 | 8.61 | 8.02 | 36.93 | 37.05 |
| 2',3'-dichloro-6'-methyl-benzenesulphonyl-2-amino-Δ-2-thiazoline | 325.252 | 137–139 | 8.61 | 8.05 | 36.93 | 37.41 |
| 2',3'-dimethyl-6'-chloro-benzenesulphonyl-2-amino-Δ-2-thiazoline | 304.829 | 144–146 | 9.18 | 9.04 | 43.34 | 43.34 |
| 3',6'-dichloro-4'-methyl-benzenesulphonyl-2-amino-Δ-2-thiazoline | 325.252 | 154–160 | 8.61 | 8.42 | 36.93 | 37.48 |
| 4'-chloro-3'-methyl-benzenesulphonyl-2-amino-Δ-2-thiazoline | 290.803 | 118–120 | 9.63 | 9.20 | 41.30 | 40.71 |
| 4'-fluoro-benzenesulphonyl-2-amino-Δ-2-thiazoline | 260.319 | 94–96 | 10.76 | 10.63 | 41.53 | 41.74 |
| 2',5'-dichloro-benzenesulphonyl-2-amino-Δ-2-thiazoline | 311.225 | 132–134 | 9 | 8.92 | 34.73 | 34.90 |

As mentioned above, the novel sulphonamides have unique antibacterial properties that were made apparent by both in vitro and in vivo investigations.

Thus, in vitro, under similar experimental conditions, 4'-chloro-3'-methyl-benzenesulphonyl-2-amino-Δ-2-thiazoline and 4'-chloro-benzenesulphonyl-2-amino-Δ-2-thiazoline were found to inhibit the development of pathogenic colibacillus, at lower concentrations than required by sulphamethylthiadiazole, a currently widely used anti-colibacillary sulphonamide.

wherein substituents R, $R_1$ and $R_2$, which may occupy any one of the free positions of the benzene nucleus, are each selected from the group consisting of hydrogen, chlorine and fluorine atoms and alkyl groups having 1–4 carbon atoms, provided that the substituents R, $R_1$ and $R_2$ are not simultaneously hydrogen and, when one of the substituents is a methyl group, one at least of the other two is not hydrogen, and their addition salts with pharmaceutically acceptable acids.

2. 4'-chloro-benzenesulphonyl-2-amino-Δ-2-thiazoline.

3. 3'-chloro-4'-methyl-benzenesulphonyl-2-amino-Δ-2-thiazoline.
4. 3',6'-dichloro-4'-methyl-benzenesulphonyl-2-amino-Δ-2-thiazoline.
5. 4'-chloro-3'-methyl-benzenesulphonyl-2-amino-Δ-2-thiazoline.
6. 4'-fluoro-benzenesulphonyl-2-amino-Δ-2-thiazoline.

References Cited

UNITED STATES PATENTS 2,524,800  10/1950  Holtquist et al. _____ 260—306.7

OTHER REFERENCES

Burger: Medicinal Chemistry, 2nd ed., Interscience, 1960, pp. 75–6.
Elderfield: Hetercyclic Compounds, vol. 5, Wiley, 1957, pp. 690–1.
Jensen et al.: Chem. Abstracts, 35:5109–10 (1941).

ALEX MAZEL, Primary Examiner

R. J. GALLAGHER, Assistant Examiner

U.S. Cl. X.R.

424—270